(12) United States Patent
Wase et al.

(10) Patent No.: US 9,592,702 B2
(45) Date of Patent: Mar. 14, 2017

(54) FRICTION BODY, WRITING INSTRUMENT AND WRITING INSTRUMENT SET

(75) Inventors: Takashi Wase, Nagoya (JP); Michiyuki Yasuda, Nagoya (JP); Yoshiaki Okawara, Nagoya (JP)

(73) Assignees: THE PILOT INK CO., LTD., Aichi (JP); KABUSHIKI KAISHA PILOT CORPORATION, Tokyo (JP)

( * ) Notice: Subject to any disclaimer, the term of this patent is extended or adjusted under 35 U.S.C. 154(b) by 2496 days.

(21) Appl. No.: 12/124,211

(22) Filed: May 21, 2008

(65) Prior Publication Data
US 2008/0292385 A1    Nov. 27, 2008

(30) Foreign Application Priority Data

May 22, 2007  (JP) ................................ 2007-135405
May 25, 2007  (JP) ................................ 2007-139609

(51) Int. Cl.
| | |
|---|---|
| B43K 1/08 | (2006.01) |
| B43K 7/02 | (2006.01) |
| B43K 7/10 | (2006.01) |
| B43K 8/04 | (2006.01) |
| B43K 8/06 | (2006.01) |
| B43K 23/12 | (2006.01) |
| B43K 29/02 | (2006.01) |
| B43L 19/00 | (2006.01) |
| C09D 11/16 | (2014.01) |
| C09D 11/18 | (2006.01) |

(52) U.S. Cl.
CPC ................ *B43K 1/086* (2013.01); *B43K 7/02* (2013.01); *B43K 7/10* (2013.01); *B43K 8/04* (2013.01); *B43K 8/06* (2013.01); *B43K 23/126* (2013.01); *B43K 29/02* (2013.01); *B43L 19/0025* (2013.01); *B43L 19/0068* (2013.01); *C09D 11/16* (2013.01); *C09D 11/18* (2013.01)

(58) Field of Classification Search
USPC ........................................... 401/195, 198, 52
See application file for complete search history.

(56) References Cited

U.S. PATENT DOCUMENTS

| | | | | |
|---|---|---|---|---|
| 6,017,594 | A  * | 1/2000 | Sheets | ........................... 428/1.1 |
| 6,346,024 | B1 * | 2/2002 | Engel | .............................. 446/14 |

FOREIGN PATENT DOCUMENTS

| | | |
|---|---|---|
| CN | 2209044 Y | 10/1995 |
| CN | 1291555 A | 4/2001 |
| CN | 1349148 A | 5/2002 |
| CN | 1429153 A | 7/2003 |
| CN | 101007482 A | 8/2007 |
| EP | 0382241 A2 | 8/1990 |

(Continued)

OTHER PUBLICATIONS

Extended European Search Report dated Aug. 27, 2008.

(Continued)

*Primary Examiner* — Huyen Le
(74) *Attorney, Agent, or Firm* — Sughrue Mion, PLLC

(57) ABSTRACT

There is provided a friction body which is adapted to rub a thermochromic image or handwriting formed on a paper surface by use of thermochromic ink to thermally discolor the thermochromic image or handwriting by frictional heat resultant from rubbing, a thermal conductivity of a friction portion of the friction body is set to be within 0.05 W/(m·K) to 50 W/(m·K).

45 Claims, 8 Drawing Sheets

(56) References Cited

FOREIGN PATENT DOCUMENTS

| | | |
|---|---|---|
| EP | 0792759 A2 | 9/1997 |
| EP | 1080945 A2 | 3/2001 |
| GB | 2205255 A | 12/1988 |
| JP | 63-80177 U | 5/1988 |
| JP | 3-56682 U | 5/1991 |
| JP | 06-001917 A | 1/1994 |
| JP | 6-71164 U | 10/1994 |
| JP | 7241388 A | 9/1995 |
| JP | 8-39983 A | 2/1996 |
| JP | 08-220913 A | 8/1996 |
| JP | 10-283107 A | 10/1998 |
| JP | 11-110112 A | 4/1999 |
| JP | 2001-10277 A | 1/2001 |
| JP | 2001-22510 A | 1/2001 |
| JP | 2001-138688 A | 5/2001 |
| JP | 2003-296009 A | 10/2003 |
| JP | 2004-148744 A | 5/2004 |
| JP | 2004146106 A | 5/2004 |
| JP | 2004-244489 A | 9/2004 |
| JP | 2005-131793 A | 5/2005 |
| JP | 2006-044144 A | 2/2006 |
| JP | 2006-123324 A | 5/2006 |
| JP | 2006-335848 A | 12/2006 |
| JP | 2007-223302 A | 9/2007 |
| JP | 2008-155624 A | 7/2008 |

OTHER PUBLICATIONS

J.P. Holman; "Heat Transfer"; 1997; McGraw-Hill, USA, 114320 XP002490752; p. 641; Tables A-3.
Office Action dated Jun. 3, 2011 from the Japanese Patent Office in counterpart Japanese application No. 2007-139609.
Communication issued on Jan. 23, 2012 by the Japanese Patent Office in the counterpart Japanese Patent Application No. 2007-139609.
Yasuda, T. et. al. "Test methods and evaluation results of dynamic characteristics of plastic materials (11)", Plastics, Japan Industrial Standards, Dec. 2000, vol. 51, No. 12, pp. 125-130.
Japanese Office Action issued Nov. 25, 2011, in corresponding Application No. 2007-135405.
Japanese Office Action issued Nov. 25, 2011, in corresponding Application No. 2007-139609.
Noriyuki Suganuma; "Recent Trends of Silicone Rubber"; vol. 78-2; Magazine of the Society of Rubber Industry; Japan, 2005; pages total.
Chemistry Handbook, Basic Edition, 4th Revised Version Published Sep. 30, 1992; Maruzen Publishing Co.
Communication from the Japanese Patent Office dated Oct. 30, 2012, in a counterpart application No. 2007-135405.
Office Action dated Feb. 19, 2013 issued by the Japanese Patent Office in counterpart Japanese Patent Application No. 2012-104283.
"Look Up 2007", Pilot general catalog, The Pilot Co., Ltd., Jan. 1, 2007, 4 pages total.
Notification of Provided Information issued Jan. 9, 2013 issued by the Japanese Patent Office in counterpart Japanese Patent Application No. 2012-104283.
"Mechanical Engineers' Handbook (vol. 1)", Yunnan Science & Technology Press, May 1988, pp. 375.
"Mechanical Engineering Materials Handbook: Non-metallic Materials (4th Edition)", China Machine Press, Sep. 1992, pp. 5-6.
Office Action dated Feb. 24, 2014, issued by the State Intellectual Property Office of the People's Republic of China in counterpart Chinese Application No. 200810099706.2.
Office Action, dated Dec. 17, 2013, issued by the Japanese Patent Office in counterpart Japanese Patent Application No. 2012-104283.
Office Action dated Mar. 4, 2014 issued by the State Intellectual Property Office of P.R. China in corresponding Chinese Application No. 201210286913.5.
Request for Invalidation trial about the corresponding Korean Patent No. 1552715; May 2016.
Pilot Look Up 2007, General Catalog, Published on Jan. 1, 2007.
Judgment Document about the corresponding Chinese Patent; 2015.

\* cited by examiner

FRICTION BODY, WRITING INSTRUMENT AND WRITING INSTRUMENT SET

FIELD OF THE INVENTION

The present invention relates to a friction body capable of thermally discoloring a thermochromic image or handwriting by frictional heat, a writing instrument having the friction body and a writing instrument set including a combination of the friction body and the writing instrument.

RELATED ART

There is an elastic friction body that discolors an image or handwriting formed by use of reversible thermochromic ink from a first state into a second state by frictional heat, (see Japanese Patent Unexamined Publications JP-A-2004-148744 and JP-A-2006-123324.

However, in the related-art friction body, there still exists a room for improvement when attempting to surely and easily thermally discolor a thermochromic image or handwriting by frictional heat caused by manual friction for people regardless of age and sex.

When a thermochromic image or handwriting is rubbed by the related-art friction body, if force applied to the friction body and speed for moving the friction body are comparatively small (e.g., an aged person, a female, a child and the like, uses the friction body), there is a fear that the friction body cannot thermally discolor the thermochromic image or handwriting reliably.

Moreover, when a contact area between the friction body and the paper surface formed in rubbing is set to a comparatively-large area, there is a also fear that a related-art friction body fail to thermally discolor a thermochromic image or handwriting reliably.

SUMMARY OF THE INVENTION

The present invention solves the drawbacks of the related art and attempts to provide a friction body that enables people of all ages and both sexes to reliably, readily perform thermal discoloring of a thermochromic image or handwriting by frictional heat. Moreover, the present invention attempts to provide a writing instrument having a friction body that enables people of all ages and both sexes to reliably, readily perform thermal discoloring of a thermochromic image or handwriting by frictional heat, as well as providing a writing instrument set including a combination of the friction body and the writing instrument.

The inventor of the present invention paid attention to thermal conductivity of a frictional portion of a friction body and has found, through assiduous study, that the thermochromic image or handwriting can be reliably thermally discolored by frictional heat of the friction body when setting the thermal conductivity of the frictional portion of the friction body to a specific range.

Further, the inventor of the present invention pays attention to a friction coefficient between a friction body and the paper surface, load exerted on the friction body during friction, the traveling speed of the friction body during rubbing and a contact area of the friction body during rubbing. Through assiduous study, the inventor has found that a thermochromic image or handwriting can be thermally discolored reliably and easily when frictional heat of the friction body satisfies a relation described below.

[1] According to a first aspect of the invention, there is provided a friction body which is adapted to rub a thermochromic image or handwriting formed on a paper surface by use of thermochromic ink to thermally discolor the thermochromic image or handwriting by frictional heat resultant from rubbing, wherein thermal conductivity of a friction portion of the friction body is ranging from 0.05 W/(m·K) to 50 W/(m·K).

In the friction body of the first aspect of the invention, since the thermal conductivity is set to a range from 0.05 W/(m·K) to 50 W/(m·K), people of all ages and both sexes can readily thermally discolor the thermochromic image or handwriting without fail by frictional heat resultant from manual friction.

When the thermal conductivity of the friction portion of the friction body exceeds 50 [W/(m·K)], there is a fear that for instance, an aged person or a child, will not be able to thermally discolor the thermochromic image or handwriting without fail by frictional heat of the friction body. On the other hand, when the thermal conductivity of the friction portion of the friction body is smaller than 0.05 [W/(m·K)], there is a possibility that the friction body or the paper surface will be damaged by excessive heat.

[2] According to a second aspect of the invention as set forth in the first aspect of the invention, the thermal conductivity of the friction portion of the friction body is ranging from 0.05 W/(m·K) to 20 W/(m·K).

According to the friction body of the second aspect of the invention, the thermal conductivity is set to a range from 0.05 W/(m·K) to 20 W/(m·K), people of all ages and both sexes can readily thermally discolor the thermochromic image or handwriting without fail by frictional heat resultant from manual friction.

When the thermal conductivity of the friction portion of the friction body exceeds 20 [W/(m·K)], there is a fear that for instance, an aged person or a child, will not be able to thermally discolor a thermochromic image or handwriting without fail by frictional heat of the friction body. On the other hand, when the thermal conductivity of the friction portion of the friction body is smaller than 0.05 [W/(m·K)], there is a fear that the friction body or the paper surface will be damaged by excessive heat.

[3] According to a third aspect of the present invention, as set forth in second aspect of the invention, the thermal conductivity of a friction portion of the friction body is set to a range from 0.05 W/(m·K) to 10 W/(m·K).

According to the friction body of the third aspect of the invention, the thermal conductivity is set to a range from 0.05 W/(m·K) to 10 W/(m·K), people of all ages and both sexes can readily thermally discolor the thermochromic image or handwriting without fail by frictional heat resultant from manual friction.

When the thermal conductivity of the friction portion of the friction body exceeds 10 [W/(m·K)], there is a fear that for instance, an aged person or a child, will not be able to thermally discolor the thermochromic image or handwriting without fail by frictional heat of the friction body. On the other hand, when the thermal conductivity of the friction portion of the friction body is smaller than 0.05 [W/(m·K)], there is a fear that the friction body or a paper surface will be damaged by excessive heat.

In the first, second and third inventions, the thermal conductivity is measured at pressure loading of 250 Kg/m$^2$, a high temperature plate of 35° C. and a low temperature plate of 5° C. by use of AUTOA (HC-072) manufactured by EKO INSTRUMENTS CO. LTD. The unit of thermal conductivity is watt per meter and Kelvin [W/(m·K)]. In the first, second and third inventions, the friction portion of the friction body means a portion that causes frictional heat upon contacting the thermochromic image or handwriting on the paper surface.

[4] According to a fourth aspect of invention, as set forth in the first, second or third aspect of the invention, a friction coefficient between the friction portion of the friction body and the paper surface is set to a range from 0.2 to 1.0.

Since the friction coefficient between the friction portion of the friction body and the paper surface is set to a range from 0.2 to 1.0, the friction body of the fourth invention enables thermal discoloration of the thermochromic image or handwriting in a more reliable and easy manner.

When the friction coefficient between the friction portion of the friction body and the paper surface is smaller than 0.2, thermal discoloration of the thermochromic image or handwriting cannot be performed readily even when the image or handwriting is rubbed under heavy load. On the other hand, when the friction coefficient between the friction portion of the friction body and the paper surface is greater than 1.0, there is a fear that difficulty will be encountered in achievement of smooth manual friction or damage will be inflicted on the paper surface because excessively large frictional resistance to the paper surface arises during friction.

Regarding the friction coefficient (coefficient of kinetic friction), a friction coefficient (=frictional force/load) is measured in following conditions by using a surface characteristic measurement instrument: HEIDON-14D manufactured by Shinto Scientific Co., Ltd.

Velocity of the friction body: 100 mm/minute
Load: 500 g (4.9 N)
Paper: a writing paper A (former JIS P3201: high-quality paper that is produced by taking one-hundred-percent chemical pulp as a raw material, weighing range of 40 to 157 g/m² and whiteness of 75.0% or more

[5] According to a fifth aspect of the present invention, as set forth in the first aspect of the invention, when a friction coefficient between the friction body and the paper surface is defined as $\mu$;

a vertical load imparted to the paper surface by the friction body when the thermochromic image or handwriting on the paper surface is rubbed with the friction body is defined as W (N);

a velocity at which the friction body travels over the paper surface when the thermochromic image or handwriting on the paper surface is rubbed with the friction body is defined as V (m/s); and a contact area where the friction body contacts the paper surface when the thermochromic image or handwriting on the paper surface is rubbed with the friction body is defined as A (cm²), the friction body satisfies a relation of $(\mu \times W \times V)/A \geq 4$.

According to the friction body of the fifth aspect of the invention, even when the force applied to a friction body or a speed at which the friction body is moved is comparatively small, thermal discoloration of the thermochromic image or handwriting can be readily performed without fail by frictional heat.

[6] According to a sixth aspect of the invention, as set forth in the fifth aspect of the invention, the friction body satisfies a relation of $(\mu \times W \times V)/A \geq 15$.

[7] According to a seventh aspect of the invention, as set forth in the fifth aspect of the invention, the friction body satisfies a relation of $(\mu \times W \times V)/A \leq 2000$.

[8] According to an eighth aspect of the invention, as set forth in the fifth aspect of the invention, the load W is selected from a range from 0.9 N to 10 N and the contact area A is selected from a range from 0.005 cm² to 0.3 cm².

[9] According to a ninth aspect of the invention, as set forth in the fifth aspect of the invention, when frictional motion is manually performed, the velocity V is selected from a range from 0.1 m/s to 1.0 m/s.

More preferably, the velocity V is selected from a range from 0.1 m/s to 0.5 m/s.

[10] According to a tenth aspect of the invention, as set forth in the first aspect of the invention, when a vertical load W imparted to the paper surface by the friction body when the thermochromic image or handwriting on the paper surface is rubbed with the friction body is set to be 4.9 N; and a velocity V at which the friction body travels over the paper surface when the thermochromic image or handwriting on the paper surface is rubbed with the friction body is set to be 0.5 m/s, and a friction coefficient between the friction body and the paper surface is defined as $\mu$; and a contact area where the friction body contacts the paper surface when the thermochromic image or handwriting on the paper surface is rubbed with the friction body is defined as A (cm²), the friction body satisfies a relation of $\mu/A \geq 1.5$.

According to the friction body of the tenth aspect of the invention, even when a contact area between the friction body and the paper surface achieved during friction is comparatively large, thermal discoloration of the thermochromic image or handwriting can be readily performed without fail by frictional heat.

[11] According to an eleventh aspect of the invention, as set forth in the tenth aspect of the invention, the friction body satisfies a relation of $\mu/A \geq 6$.

According to the friction body of the eleventh invention, even when a contact area between the friction body and the paper surface achieved during friction is comparatively large, thermal discoloration of the thermochromic image or handwriting can be readily performed without fail by frictional heat.

[12] According to a twelfth aspect of the invention, as set forth in the tenth aspect of the invention, the friction body satisfies a relation of $\mu/A \leq 200$.

[13] According to a thirteenth aspect of the invention, as set forth in the tenth aspect of the invention, the contact area A is selected from a range from 0.005 cm² to 0.3 cm².

[14] According to a fourteenth aspect of the invention, there is provided a writing instrument including:

the friction body of any one of the first through thirteenth aspect of the invention; and a thermochromic ink which is adapted to be flowed out.

The writing instrument of the fourteenth aspect of the invention enables reliable, easy, thermal discoloration of the thermochromic image or handwriting formed by the writing instrument by friction of the friction body provided in a part of the writing instrument.

[15] According to a fifteenth aspect of the invention, the writing instrument of the fourteenth aspect of the invention further includes:

a writing instrument main body;

the thermochromic ink incorporated in the writing instrument main body; and a pen tip made up of a ball-point-pen tip and capable of supplying the thermochromic ink, the pen tip being provided at a front end of the writing instrument main body, wherein the friction body is provided at a rear end of the writing instrument main body.

[16] According to a sixteenth aspect of the invention, the writing instrument of the fourteenth aspect of the invention further includes:

a writing instrument main body;

the thermochromic ink incorporated in the writing instrument main body;

a pen tip made up of a ball-point-pen tip and capable of supplying the thermochromic ink, the pen tip being provided at a front end of the writing instrument main body; and a removable cap provided at a pen tip side of the writing instrument main body, wherein the friction body is provided at a top of the cap.

[17] According to a seventeenth aspect of the invention, the writing instrument of the fourteenth aspect of the invention includes:

a pen tip made of a processed fibrous element or a porous element which is capable of supplying the thermochromic ink;

a writing instrument main body including:

an ink tank which stores thermochromic ink and to which the pen tip is attached so as to be movable back and forward; and a valve mechanism which opens when the pen tip is pressed rearward; and a removable cap provided at the pen tip side of the writing instrument main body, wherein the friction body is provided at a rear end of the writing instrument main body or a top of the cap.

[18] According to an eighteenth aspect of the invention, the writing instrument of the fourteenth aspect of the invention includes:

a writing instrument main body including:

an ink absorbing element which is made of an element having continuous pores and impregnated with the thermochromic ink and a pen tip which is made of a processed fibrous element or a porous element, which is connected to the ink absorbing element and which supplies the thermochromic ink; and a removable cap provided at a pen tip side of the writing instrument main body, wherein the friction body is provided at a rear end of the writing instrument main body or the top of the cap.

[19] According to a nineteenth aspect of the invention, the writing instrument of the fourteenth aspect of the invention includes:

a writing instrument main body including:

a pen tip made up of a ball-point-pen tip which supplies the thermochromic ink;

an ink tank storing the thermochromic ink; and an ink reservoir which is interposed between the pen tip and the ink tank and which temporarily holds overflowing ink when an internal pressure of the ink tank increases; and a removable cap provided at a pen tip side of the writing instrument main body, wherein the friction body is provided at a rear end of the writing instrument main body or a top of the cap.

[20] According to a twentieth aspect of the invention, there is provided a writing instrument set including:

the friction body of any one of the first through thirteenth aspect of the invention; and a writing instrument which incorporates and supplies the thermochromic ink.

The writing instrument set of the twentieth invention enables reliable, easy thermal discoloration of the thermochromic image or handwriting formed by a writing instrument by friction of a friction body combined with the writing instrument.

[21] According to a twenty-first aspect of the invention, there is provided a friction body which is adapted to rub a thermochromic image or handwriting formed on a paper surface by use of thermochromic ink to thermally discolor the thermochromic image or handwriting by frictional heat resultant from rubbing, wherein when a friction coefficient between the friction body and the paper surface is defined as $\mu$;

a vertical load imparted to the paper surface by the friction body when the thermochromic image or handwriting on the paper surface is rubbed with the friction body is defined as W (N);

a velocity at which the friction body travels over the paper surface when the thermochromic image or handwriting on the paper surface is rubbed with the friction body is defined as V (m/s); and a contact area where the friction body contacts the paper surface when the thermochromic image or handwriting on the paper surface is rubbed with the friction body is defined as A ($cm^2$), the friction body satisfies a relation of $(\mu \times W \times V)/A \geq 4$.

According to the friction body of the twenty-first aspect of the invention, even when force applied to the friction body or a velocity at which the friction body is moved is comparatively small, thermal discoloration of the thermochromic image or handwriting can be readily performed without fail by frictional heat.

[22] According to a twenty-second aspect of the invention as set forth in the twenty-first aspect of the invention, the friction body satisfies a relation of $(\mu \times W \times V)/A \leq 2000$.

[23] According to a twenty-third aspect of the invention as set forth in the twenty-first aspect of the invention, the friction coefficient $\mu$ between the friction portion of the friction body and the paper surface is ranging from 0.2 to 1.0.

[24] According to a twenty-fourth aspect of the invention as set forth in the twenty-first aspect of the invention, the load W is selected from a range from 0.9 N to 10 N and the contact area A is selected from a range from 0.005 $cm^2$ to 0.3 $cm^2$.

[25] According to a twenty-fifth aspect of the invention as set forth in the twenty-first aspect of the invention, when frictional motion is manually performed, the velocity V is selected from a range from 0.1 m/s to 1.0 m/s.

[26] According to a twenty-sixth aspect of the invention, there is provided a friction body which is adapted to rub a thermochromic image or handwriting formed on a paper surface by use of thermochromic ink to thermally discolor the thermochromic image or handwriting by frictional heat resultant from rubbing, when a vertical load W imparted to the paper surface by the friction body when the thermochromic image or handwriting on the paper surface is rubbed with the friction body is set to be 4.9 N; and a velocity V at which the friction body travels over the paper surface when the thermochromic image or handwriting on the paper surface is rubbed with the friction body is set to be 0.5 m/s, and a friction coefficient between the friction body and the paper surface is defined as $\mu$; and a contact area where the friction body contacts the paper surface when the thermochromic image or handwriting on the paper surface is rubbed with the friction body is defined as A (cm$^2$), the friction body satisfies a relation of $\mu/A \geq 1.5$.

According to the friction body of the twenty-sixth aspect of the invention, even when a contact area between the friction body and the paper surface achieved during friction is comparatively large, thermal discoloration of the thermochromic image or handwriting can be readily performed without fail by frictional heat.

[27] According to a twenty-seventh aspect of the invention as set forth in the twenty-sixth aspect of the invention, the friction body satisfies a relation of $\mu/A \leq 200$.

[28] According to a twenty-eighth aspect of the invention as set forth in the twenty-sixth aspect of the invention, the friction coefficient $\mu$ between the friction portion of the friction body and the paper surface is ranging from 0.2 to 1.0.

[29] According to a twenty-ninth invention as set forth in the twenty-eighth aspect of the invention the contact area A is selected from a range from 0.005 cm$^2$ to 0.3 cm$^2$.

[30] According to a thirtieth aspect of the invention, there is provided a friction body which is adapted to rub a thermochromic image or handwriting formed on a paper surface by use of thermochromic ink to thermally discolor the thermochromic image or handwriting by frictional heat resultant from rubbing, wherein when a friction coefficient between the friction body and the paper surface is defined as $\mu$;

a vertical load imparted to the paper surface by the friction body when the thermochromic image or handwriting on the paper surface is rubbed with the friction body is defined as W (N);

a velocity at which the friction body travels over the paper surface when the thermochromic image or handwriting on the paper surface is rubbed with the friction body is defined as V (m/s); and a contact area where the friction body contacts the paper surface when the thermochromic image or handwriting on the paper surface is rubbed with the friction body is defined as A (cm$^2$), the friction body satisfies a relation of $(\mu \times W \times V)/A \leq 15$.

According to the friction body of the thirtieth aspect of the invention, even when force applied to the friction body or a velocity at which the friction body is moved is comparatively small, thermal discoloration of the thermochromic image or handwriting can be performed without fail in an easy manner by frictional heat.

[31] According to a thirty-first aspect of the invention as set forth in the thirtieth aspect of the invention, the friction body satisfies a relation of $(\mu \times W \times V)/A \leq 2000$.

[32] According to a thirty-second aspect of the invention as set forth in the thirtieth aspect of the invention, the friction coefficient $\mu$ between the friction portion of the friction body and the paper surface is ranging from 0.2 to 1.0.

[33] According to a thirty-third aspect of the invention as set forth in the thirtieth aspect of the invention, the load W is selected from a range from 0.9 N to 10 N and the contact area A is selected from a range from 0.005 cm$^2$ to 0.3 cm$^2$.

[34] According to a thirty-fourth aspect of the invention as set forth in the thirtieth aspect of the invention, when frictional motion is manually performed, the velocity V is selected from a range from 0.1 m/s to 1.0 m/s.

[35] According to a thirty-fifth aspect of the invention, there is provided a friction body which is adapted to rub a thermochromic image or handwriting formed on a paper surface by use of thermochromic ink to thermally discolor the thermochromic image or handwriting by frictional heat resultant from rubbing, wherein when a vertical load W imparted to the paper surface by the friction body when the thermochromic image or handwriting on the paper surface is rubbed with the friction body is set to be 4.9 N; and a velocity V at which the friction body travels over the paper surface when the thermochromic image or handwriting on the paper surface is rubbed with the friction body is set to be 0.5 m/s, and a friction coefficient between the friction body and the paper surface is defined as $\mu$; and a contact area where the friction body contacts the paper surface when the thermochromic image or handwriting on the paper surface is rubbed with the friction body is defined as A (cm$^2$), the friction body satisfies a relation of $\mu/A \geq 6$.

According to the friction body of the thirty-fifth aspect of the invention, even when a contact area between the friction body and the paper surface achieved during friction is comparatively large, the thermochromic image or handwriting can be thermally discolored without fail in an easy manner by frictional heat.

[36] According to a thirty-sixth aspect of the invention as set forth in the thirty-fifth aspect of the invention, the friction body satisfies a relation of $\mu/A \leq 200$.

[37] According to a thirty-seventh aspect of the invention as set forth in the thirty-fifth aspect of the invention, the friction coefficient $\mu$ between the friction portion of the friction body and the paper surface is ranging from 0.2 to 1.0.

[38] According to a thirty-eighth aspect of the invention as set forth in the thirty-fifth aspect of the invention, the contact area A is selected from a range from 0.005 cm$^2$ to 0.3 cm$^2$.

[39] According to a thirty-ninth aspect of the invention, there is provided a writing instrument including, the friction body defined in any one of twenty-first through thirty-eighth aspects of the invention; and a thermochromic ink which is adapted to be flowed out.

The writing instrument of the thirty-ninth aspect of the invention enables reliable, easy, thermal discoloration of the thermochromic image or handwriting formed by the writing instrument by friction of the friction body provided in a part of the writing instrument.

[40] According to a fortieth aspect of the invention, the writing instrument of the thirty-ninth invention includes:

a writing instrument main body;

the thermochromic ink incorporated in the writing instrument main body; and a pen tip made up of a ball-point-pen tip and capable of supplying the thermochromic ink, the pen tip being provided at a front end of the writing instrument main body, wherein the friction body is provided at a rear end of the writing instrument main body.

[41] According to a forty-first aspect of the invention, the writing instrument of thirty-ninth aspect of the invention including:

a writing instrument main body;
the thermochromic ink incorporated in the writing instrument main body;
a pen tip made up of a ball-point-pen tip and capable of supplying the thermochromic ink, the pen tip being provided at a front end of the writing instrument main body; and
a removable cap provided at a pen tip side of the writing instrument main body,
wherein the friction body is provided at a top of the cap.

[42] According to a forty-second aspect of the invention, the writing instrument of the thirty-ninth aspect of the invention includes:
a pen tip made of a processed fibrous element or a porous element which is capable of supplying the thermochromic ink;
a writing instrument main body including:
an ink tank which stores the thermochromic ink and to which the pen tip is attached so as to be movable back and forward; and
a valve mechanism which opens when the pen tip is pressed rearward; and
a removable cap provided at the pen tip side of the writing instrument main body,
wherein the friction body is provided at a rear end of the writing instrument main body or a top of the cap.

[43] According to a forty-third aspect of the invention, the writing instrument of the thirty-ninth aspect of the invention includes:
a writing instrument main body including:
an ink absorbing element which is made of an element having continuous pores and impregnated with the thermochromic ink and
a pen tip which is made of a processed fibrous element or a porous element, which is connected to the ink absorbing element and which supplies the thermochromic ink; and
a removable cap provided at a pen tip side of the writing instrument main body,
wherein the friction body is provided at a rear end of the writing instrument main body or the top of the cap.

[44] According to a forty-fourth aspect of the invention, the writing instrument of the thirty-ninth aspect of the invention includes:
a writing instrument main body including:
a pen tip made up of a ball-point-pen tip which supplies the thermochromic ink;
an ink tank storing the thermochromic ink; and
an ink reservoir which is interposed between the pen tip and the ink tank and which temporarily holds overflowing ink when an internal pressure of the ink tank increases,
a removable cap provided at a pen tip side of the writing instrument main body,
wherein the friction body is provided at a rear end of the writing instrument main body or a top of the cap.

[45] According to a forty-fifth aspect of the invention, there is provided a writing instrument set including:
the friction body of the any one of the twenty-first through thirty-eighth aspect of the invention; and
a writing instrument which incorporates and supplies the thermochromic ink.

The writing instrument set of the forty-fifth invention enables reliable, easy, thermal discoloration of a thermochromic image or handwriting formed by a writing instrument by friction of a friction body combined with the writing instrument.

Friction Body

In the present invention, a material of a friction body may be any of glass, metal, stone, resin and the like. Among them, synthetic resins; for example, a silicone resin, a styrene-based resin (a copolymer of styrene and butadiene, a butadiene copolymer of styrene and ethylene), a fluorine-based resin, a chloroprene resin, a nitrile resin, a polyester-based resin, ethylene propylene dien monomer rubber (EPDM), polypropylene, polyethylene and the like, are preferable.

The friction body is preferably configured so as to be provided in a part of a writing instrument that stores thermochromic ink and that can supply the thermochromic ink onto the paper surface from a pen tip.

As the configuration in which the friction body is provided in the part of the writing instrument, there are exemplified that a configuration in which the friction body is provided on a side of a writing instrument main body opposite to the pen tip; a configuration in which the friction body is provided on a top of a removable cap located on the pen-tip side of the writing instrument main body and the like.

The friction body can also be combined with a writing instrument that incorporates thermochromic ink and that can supply the thermochromic ink from a pen tip, to thus be embodied as a writing instrument set.

The friction body may also be configured in such a way that when rubbing the paper surface with the friction body, an outer peripheral surface of the friction body is gripped directly by hand or the friction body is gripped via a friction body holder.

Writing Instrument

As a pen tip of the writing instrument, there are exemplified a ball-point-pen tip, a pen element made of a processed fibrous element or a porous element, a synthetic resin pen element formed form an extruded article that has an axial capillary passageway, a pen element that is formed from a metal plate and that has a slit at a tip end thereof, a penicillate pen element and the like. A writing instrument of a direct fluid type that directly stores thermochromic ink, a writing instrument of an inner cotton type having an ink absorbing element impregnated with thermochromic ink and the like, are mentioned as the writing instrument.

Unit of Load W and Contact Area A

In the present invention, the unit of load W is Newton (N); and the unit of velocity V is a meter per second (m/s); and the unit of the contact area A is a square centimeter ($cm^2$).

Friction Coefficient μ

Regarding the friction coefficient (coefficient of kinetic friction), a friction coefficient (=frictional force/load) is measured in following conditions by using a surface characteristic measurement instrument: HEIDON-14D manufactured by Shinto Scientific Co., Ltd.

Velocity of the friction body: 100 mm/minute
Load: 500 g (4.9 N)
Paper: a writing paper A (former JIS P3201: high-quality paper that is produced by taking one-hundred-percent chemical pulp as a raw material, weighing range of 40 to 157 $g/m^2$ and whiteness of 75.0% or more Load W of the Friction Body In the present invention, it is desirable that the friction body manually perform frictional operation. When frictional operation is performed manually, it is preferable that a vertical load W imparted by the friction body to a paper surface is selected from a range from 0.9 N to 10 N.

Velocity V of the Friction Body

In the present invention, when frictional operation is manually performed, it is preferable that a velocity V at which the friction body moves over the paper surface should be arbitrarily selected from a range from 0.1 m/s to 1.0 m/s (preferably a range from 0.1 m/s to 0.5 m/s).

Contact Area A of the Friction Body

In the present invention, it is desirable that the contact area A between the friction body and the paper surface should be arbitrarily selected from a range from 0.005 cm$^2$ to 0.3 cm$^2$ (preferably a range from 0.01 cm$^2$ to 0.3 cm$^2$).

Thermochromic Ink

In the present invention, the thermochromic ink is preferably reversible thermochromic ink. The reversible thermochromic ink can be formed solely from or by combination of various types of ink, such as:

ink of heat color fadable type whose color fades from a color-developed state when heated;

ink of color storage and retention type that stores and retains a colored state or a faded state at a specific temperature range in an enantiotropic manner; and ink of a heat coloring type that develops color from a faded state when heated and that returns to a color faded state from the colored state when cooled.

In relation to a coloring material included in the reversible thermochromic ink, there is preferably employed a reversible thermochromic microcapsule pigment formed by enclosing, in a microcapsule, a reversible thermochromic composition containing at least three known indispensable components; namely, (a) an electron-releasing color-reactive organic compound; (b) an electron-accepting compound; and (c) a reactive medium that determines a generation temperature of color reaction of both compounds.

As shown in FIG. 8, in the present invention, application of thermochromic ink of color storage and retention type is preferable. The ink of color storage and retention type has a characteristic that when plotting a change in coloring density caused by the temperature change, as shown in FIG. 8, a path plotted when temperature is increased from a temperature lower than a discoloration temperature range differs from a path plotted when temperature is decreased from a temperature higher than a discoloration temperature range. Further, the ink of color storage and retention type also has a characteristic that a colored state achieved at low temperature range which is a complete coloring temperature ($t_1$) or lower; and a faded color state achieved at high temperature range which is a complete color-fading temperature ($t_4$) or higher, are stored and retained at a specific temperature range [range from $t_2$ to $t_3$ (an essentially-two-phase retaining temperature range)].

In FIG. 8, reference symbol ΔH designates a temperature range (i.e. the range of hysteresis) showing the degree of hysteresis. When a value of ΔH is small, only one state achieved before and after discoloration is present. When the value of ΔH is large, retention of states achieved before and after discoloration becomes easy.

In the present invention, a discoloration temperature induced by frictional heat of the friction body of the thermochromic ink is set to 25° C. to 95° C. (preferably 36° C. to 95° C.). Specifically, in the present invention, setting the high-temperature point of discoloration [a complete coloring temperature ($t_4$)] to a range from 25° C. to 95° C. (preferably 36° C. to 90° C.) and setting the low-temperature point of discoloration [a complete discoloration temperature ($t_1$)] to a range from −30° C. to +20° C. (preferably −30° C. to 10° C.) are effective. As a result, retention of color developed in a normal state (a temperature range for a daily activity) can be effectively performed and an image or handwriting created in reversible thermochromic ink can be readily discolored by frictional heat of the friction body.

In relation to the reversible thermochromic microcapsule pigment, an average particle size of the pigment falls within a range from 0.5 to 5.0 μm, preferably a range from 1 to 4 μm. In a system where the average particle size of pigment exceeds 5.0 μm, excurrent of pigment from the ball-point-pen tip and capillary gaps of a porous pen element is deteriorated. In a system where an average particle size of pigment is less than 0.5 μm, the ease of high-density coloration becomes difficult.

The reversible thermochromic microcapsule pigment can be formulated at 2 to 50 wt % (preferably 3 to 40 wt % and more preferably 4 to 30 wt %) with respect to the total amount of ink composition. If the concentration is less than 2 wt %, coloring density becomes insufficient. In contrast, when the concentration exceeds 50 wt %, the excurrent of ink is deteriorated, which in turn hinders ease of writing.

As the thermochromic ink, ink that changes from a colored state to a color less state by frictional heat is effective. By virtue of the characteristic, colored handwriting created in thermochromic ink can be made colorless by frictional heat resultant from friction of the friction body, and handwriting is again formed on the colorless written surface, whereby colored handwriting formed by thermochromic ink can be created. Due to this operation, the user feels as if erasing handwriting made in pencil lead by an eraser and subsequently again creating handwriting on the writing surface. Specifically, reversible thermochromic ink that changes from a colored state to a color less state when heated and that also changes from the colorless state to the colored state when cooled is effective for the thermochromic ink. Ink that changes from a colored state to another colored state differing from the colored state by frictional heat as a result of inclusion of a nonthermochromic coloring agent (a dye, a pigment, or the like) in a microcapsule or ink can also be adopted as the thermochromic ink of the present invention.

According to the present invention, the friction body enables people of all ages and both sexes to readily, reliably perform thermal discoloration of a thermochromic image or handwriting.

DETAILED DESCRIPTION OF THE PREFERRED EMBODIMENTS

First Embodiment

Figure 1:
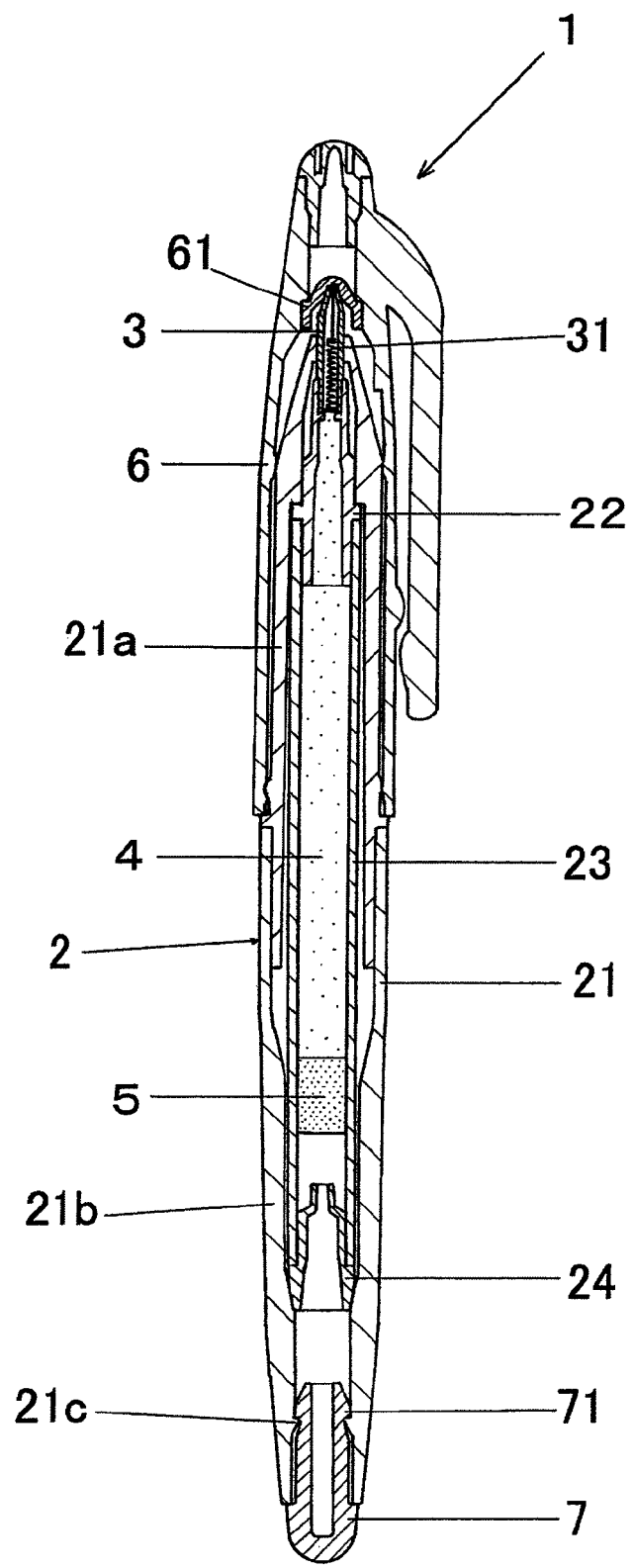
FIG. 1 is a longitudinal cross-sectional view of a writing instrument of a first embodiment of the present invention.

A first embodiment of the present invention will be described (see FIG. 1).

The present embodiment is directed toward a writing instrument 1 including: a writing instrument main body 2; a cap 6 removably attached to a pen tip of the writing instrument main body 2; and a friction body 7 attached to a rear end of the writing instrument main body 2. Thermochromic ink 4 is stored in the writing instrument main body 2 and the thermochromic ink 4 is supplied onto a paper surface from a pen tip 3.

A thermochromic image or handwriting is formed on the paper surface as a result of the pen tip 3 of the writing instrument main body 2 contacting the paper surface. The thermochromic image or handwriting can be thermally discolored by rubbing the image or handwriting formed on the paper surface with the friction body 7.

The writing instrument main body 2 includes: the pen tip 3 made up of a ball-point-pen tip; a pen tip holder 22 to which the pen tip 3 is fixed at a front end thereof; an ink storage cylinder 23 to which the pen tip holder 22 is fixed at a front end thereof, a tail plug 24 which is attached to an opening formed in a rear end of the ink storage cylinder 23 and has a ventilation opening; and a barrel 21 accommodating the ink storage cylinder 23. The thermochromic ink 4 and a following element 5 are housed in the ink storage cylinder 23. The following element 5 is disposed at a rear end of the thermochromic ink 4 and forwardly advances in association with consumption of the thermochromic ink 4

A ball is held at the front end of the pen tip 3 in a rotatable manner. An elastic element (a coil spring) 31 is housed in the pen tip 3. The ball is urged forwardly by the elastic element 31, whereby the ball is brought into compressed contact with an inwardly-facing interior surface of the front end of the pen tip 3.

A pen tip seal member 61 made from a soft material is housed in the cap 6. When the cap 6 is attached to the pen tip side of the writing instrument, the pen tip 3 comes into close contact with the pen tip seal member 61, whereupon the pen tip 3 is sealed.

The barrel 21 is made up of a front barrel 21a and a rear barrel 21b that are screw-engaged with each other. The pen tip 3 projects outwardly from a front-end hole of the barrel 21 (the front barrel 21a). The friction body 7 formed from soft synthetic resin is attached to a rear-end hole of the barrel 21 (the rear barrel 21b). An outward protrusion 71 is formed on an exterior surface of the friction body 7. An inward protrusion 21c is formed on an interior surface of the rear-end hole of the barrel 21. The outward protrusion 71 and the inward protrusion 21c are engaged with each other in a climbing manner, so that removal of the friction body 7 from the rear end hole can be avoided.

In the present embodiment, the thermal conductivity of a friction portion of the friction body 7 is ranging from 0.05 W/(m·K) to 1.0 W/(m·K) and a friction coefficient of the friction portion of the friction body 7 to the paper surface is ranging from 0.2 to 1.0.

Second Embodiment

Figure 2:
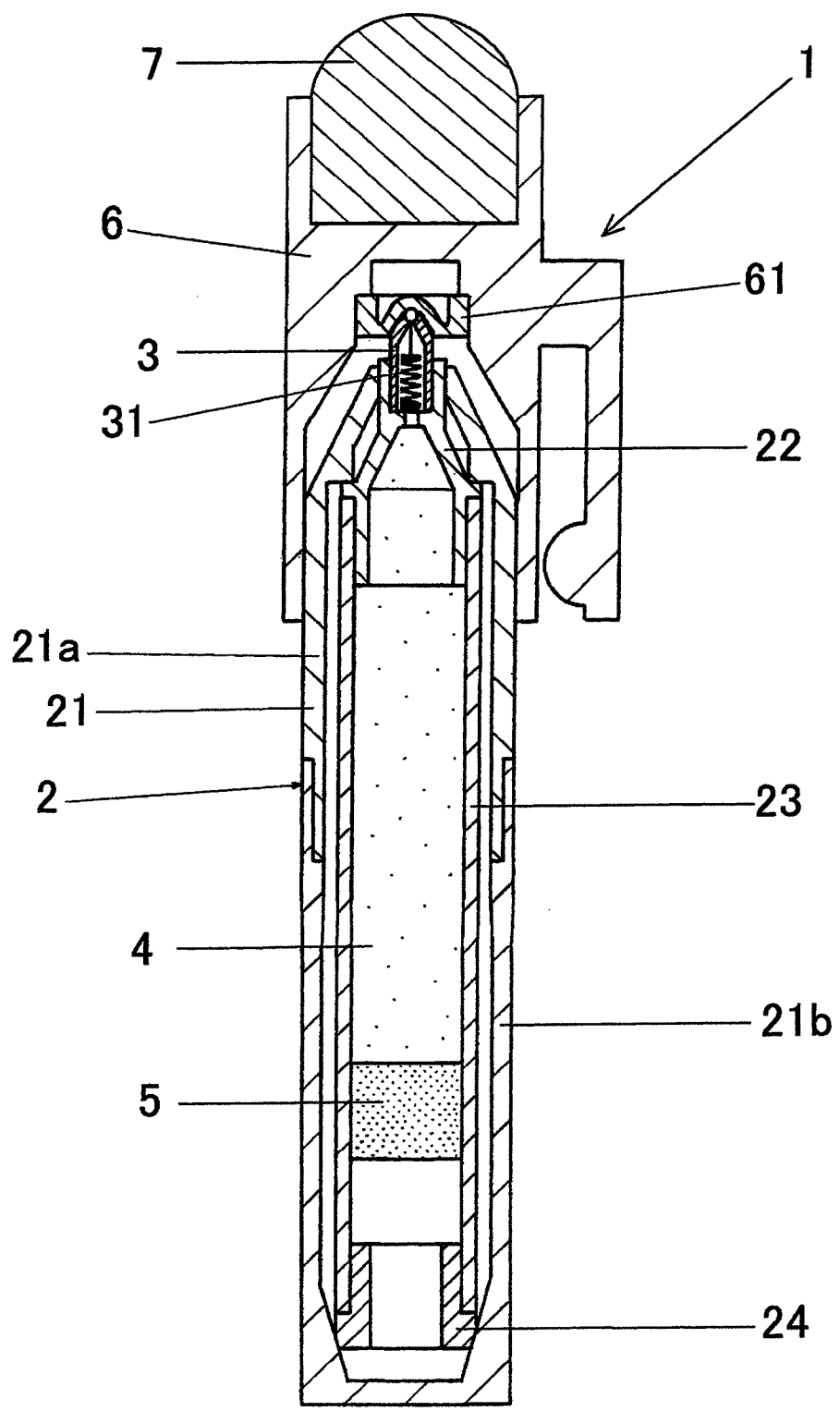
FIG. 2 is a longitudinal cross-sectional view of a writing instrument of a second embodiment of the present invention.

A second embodiment of the present invention will now be described (see FIG. 2).

The present embodiment is directed toward the writing instrument 1 including a writing instrument main body 2, a cap 6 removably attached to a pen tip of the writing instrument and the friction body 7 attached to the top of the cap 6. A thermochromic ink 4 is stored in the writing instrument main body 2 and supplied from the pen tip 3. The thermochromic image or handwriting is formed on the paper surface as a result of the pen tip 3 of the writing instrument main body 2 contacting the paper surface. The thermochromic image or handwriting can be thermally discolored by rubbing the image or handwriting formed on the paper surface with the friction body 7.

The writing instrument main body 2 includes: a pen tip 3 made up of a ball-point-pen tip; a pen tip holder 22 to which the pen tip 3 is fixed at a front end thereof; an ink storage cylinder 23 to which the pen tip holder 22 is fixed at to a front end of the ink storage cylinder; a tail plug 24 that is attached to an opening formed in a rear end of the ink storage cylinder 23 and that has a ventilation opening; and a barrel 21 accommodating the ink storage cylinder 23. The thermochromic ink 4 and the following element 5, which is disposed at the rear end of the thermochromic ink 4 and forwardly advances in association with consumption of the thermochromic ink 4, are housed in the ink storage cylinder 23. The barrel 21 is made up of the front barrel 21a and the rear barrel 21b that are screw-engaged with each other. The pen tip 3 protrudes outside from the front-end hole of the barrel 21 (the front barrel 21a).

A ball is held at the front end of the pen tip 3 in a rotatable manner. The elastic element (a coil spring) 31 is housed in the pen tip 3. The ball is urged forwardly by the elastic element 31, whereby the ball is brought into compressed contact with an inwardly-facing interior surface of the front end of the pen tip 3.

The pen tip seal member 61 made from a soft material is housed in the cap 6. When the cap 6 is attached to the pen tip side of the writing instrument, the pen tip 3 comes into close contact with the pen tip seal member 61, whereupon the pen tip 3 is sealed. The friction body 7 formed from soft synthetic resin is attached to a mount hole opened in the top of the cap 6.

In the present embodiment, the thermal conductivity of a friction portion of the friction body 7 is ranging from 0.05 W/(m·K) to 1.0 W/(m·K) and a friction coefficient of the friction portion of the friction body 7 to the paper surface is ranging from 0.2 to 1.0.

Third Embodiment

Figure 3:
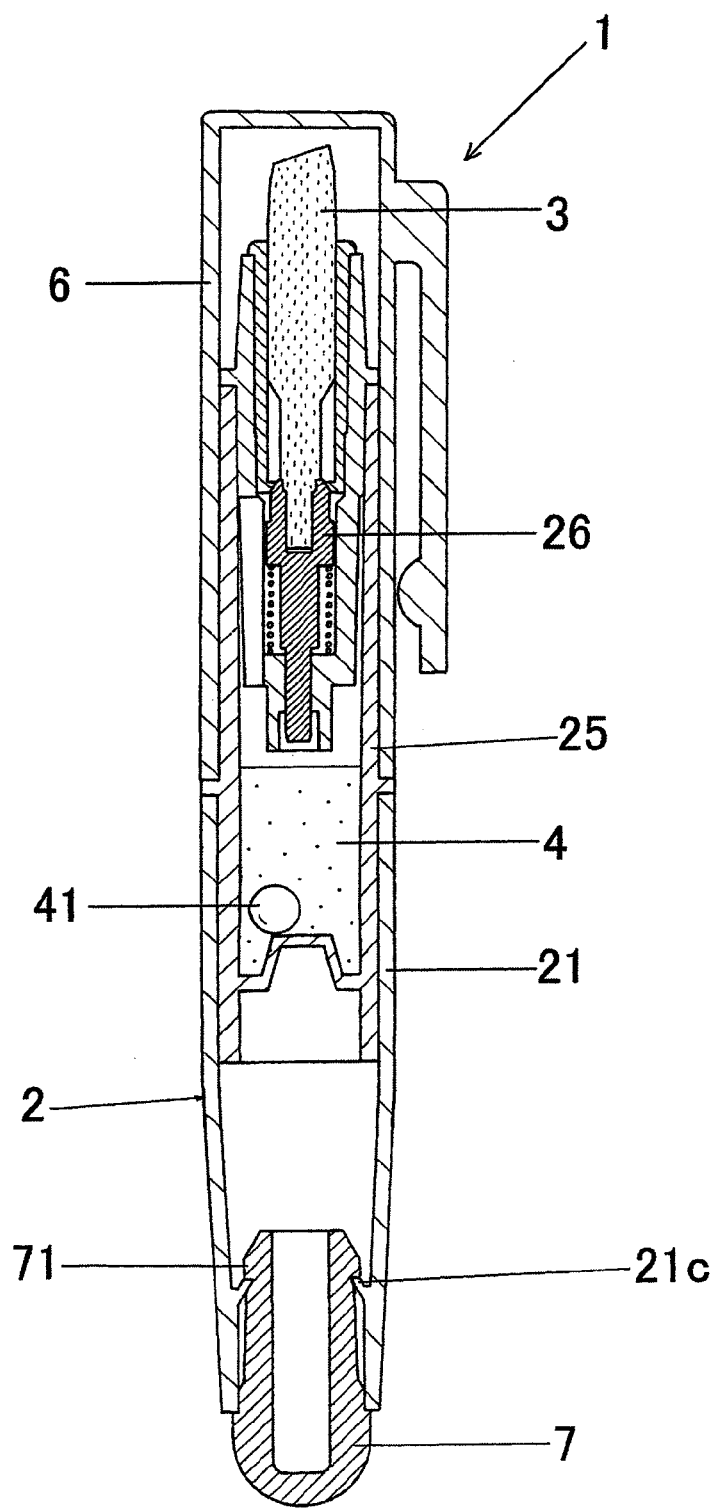
FIG. 3 is a longitudinal cross-sectional view of a writing instrument of a third embodiment of the present invention.

A third embodiment of the present invention will now be described (see FIG. 3).

The present embodiment is directed toward the writing instrument 1 including a writing instrument main body 2, a cap 6 removably attached to a pen tip of the writing instrument main body 2 and a friction body 7 attached to a rear end of the writing instrument main body 2. A thermochromic ink 4 is stored in the writing instrument main body 2 and is supplied from the pen tip 3. A thermochromic image or handwriting is formed on the paper surface as a result of the pen tip 3 of the writing instrument main body 2 contacting the paper surface. The thermochromic image or handwriting can be thermally discolored by rubbing the image or handwriting formed on the paper surface with the friction body 7.

The writing instrument main body 2 includes: a pen tip 3 made up of a processed fibrous element or a porous element; an ink tank 25 attached to the front end of the pen tip 3 so as to be movable front and back; a valve 26 that opens as a result of the pen tip 3 being pressed backwardly; a barrel 21 holding a rear portion of the ink tank 25; and a friction body 7 made up of soft synthetic resin attached to the rear end of the barrel 21. An agitation member 41 is housed in the ink tank 25.

In the embodiment, the thermal conductivity of a friction portion of the friction body 7 is ranging from 0.05 W/(m·K) to 1.0 W/(m·K) and a friction coefficient of the friction portion of the friction body 7 to the paper surface is ranging from 0.2 to 1.0.

Fourth Embodiment

Figure 4:
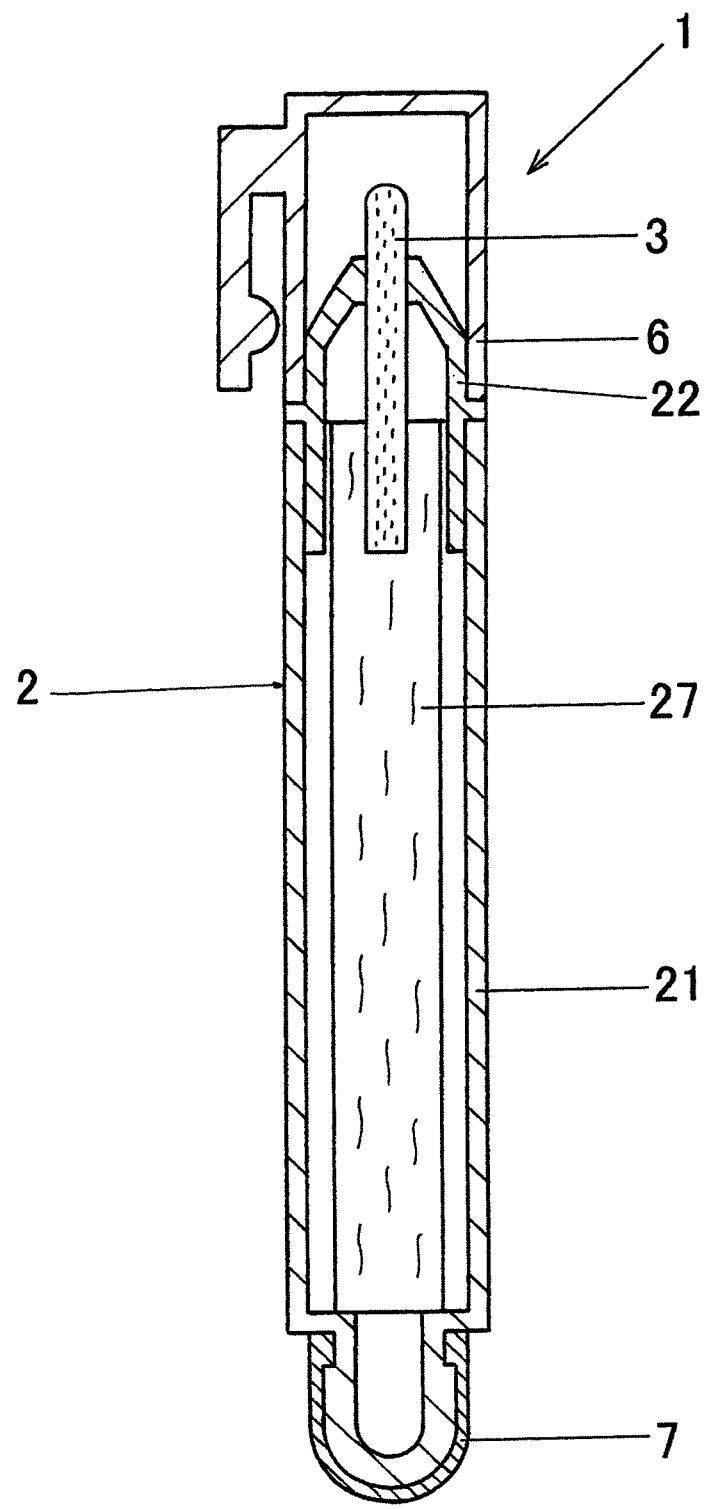
FIG. 4 is a longitudinal cross-sectional view of a writing instrument of a fourth embodiment of the present invention.

A fourth embodiment of the present invention will now be described (see FIG. 4).

The present embodiment is directed toward the writing instrument 1 including a writing instrument main body 2, a cap 6 removably attached to a pen tip of the writing instrument main body 2 and a friction body 7 attached to the rear end of the writing instrument main body 2. The thermochromic ink is stored in the writing instrument main body 2 and the thermochromic ink is emitted from the pen tip 3. A thermochromic image or handwriting is formed on the paper surface as a result of the pen tip 3 of the writing instrument main body 2 contacting the paper surface. The thermochromic image or handwriting can be thermally discolored by rubbing the image or handwriting formed on the paper surface with the friction body 7.

The writing instrument main body 2 includes: the pen tip 3 formed from a processed fibrous element or a porous element; a pen tip holder 22 that holds the pen tip 3; a barrel 21 which has the pen tip holder 22 at a front end thereof and accommodates an ink absorbing element 27 therein; and a friction body 7 that is attached to the rear end of the barrel 21 and that is formed from soft synthetic resin. The ink absorbing element 27 is formed from a member having continuous pores (e.g., a processed fibrous element and a porous material such as a porous foam) and the ink absorbing element 27 is impregnated with thermochromic ink. A rear end of the pen tip 3 is connected to a front end of the ink absorbing element 27. The friction body 7 is attached to an exterior surface of a rear end of the barrel 21 by fitting or the friction body and the rear end of the barrel are formed integrally by coinjection molding.

In the present embodiment, the thermal conductivity of a friction portion of the friction body 7 is ranging from 0.05 W/(m·K) to 1.0 W/(m·K) and a friction coefficient of the friction portion of the friction body 7 to the paper surface is ranging from 0.2 to 1.0.

Fifth Embodiment

Figure 5:
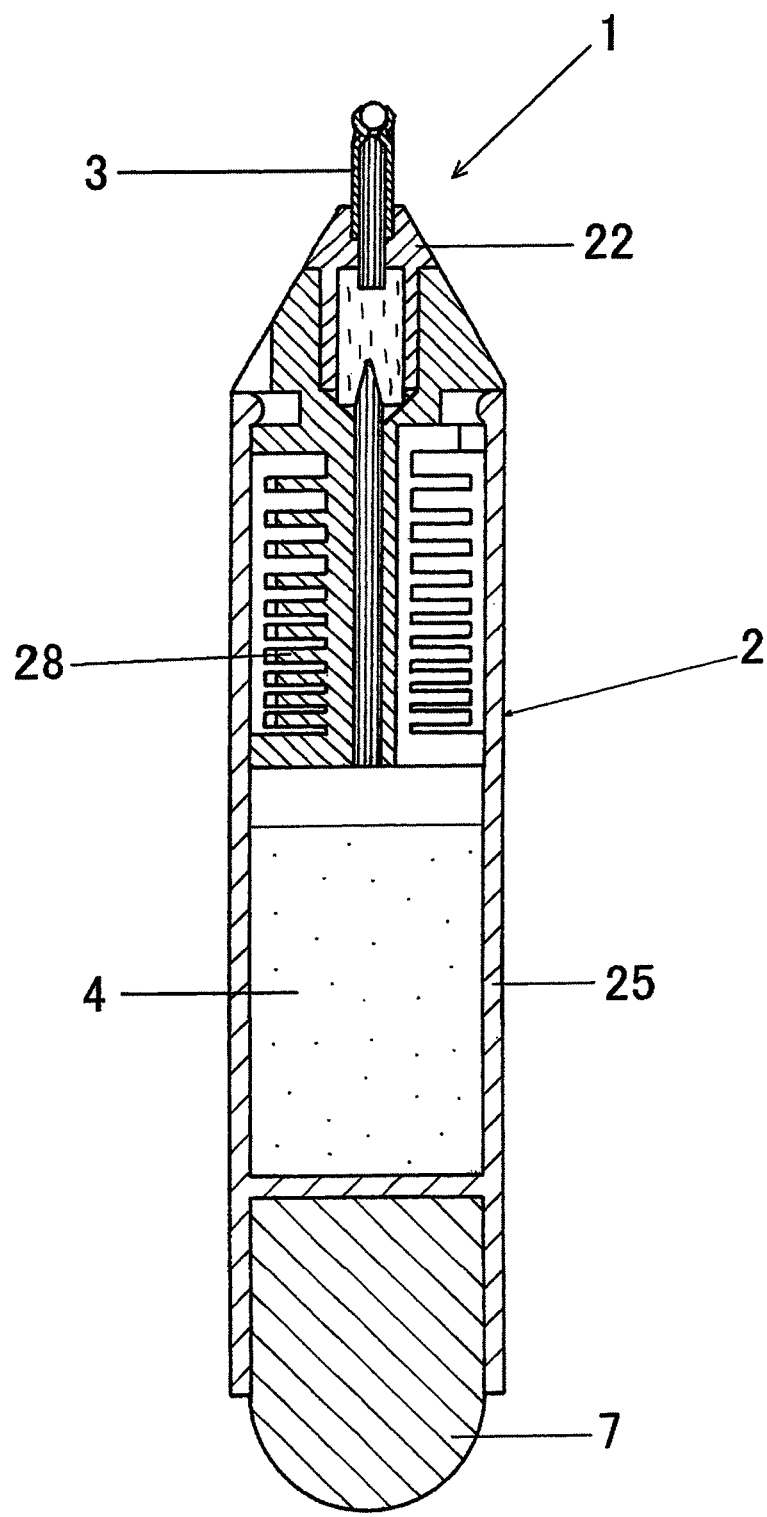
FIG. 5 is a longitudinal cross-sectional view of a writing instrument of a fifth embodiment of the present invention.

A fifth embodiment of the present invention will now be described (see FIG. 5).

The present embodiment is directed toward the writing instrument 1 including a pen tip 3 attached to the front end of the writing instrument main body 2 and a friction body 7 attached to the rear end of the writing instrument main body 2. The thermochromic ink 4 is stored in the writing instrument main body 2 and supplied from the pen tip 3. A thermochromic image or handwriting is formed on the paper surface as a result of the pen tip 3 of the writing instrument main body 2 contacting the paper surface. The thermochromic image or handwriting can be thermally discolored by rubbing the image or handwriting formed on the paper surface with the friction body 7.

The writing instrument main body 2 includes: a pen tip 3 formed from a ball-point-pen tip; a pen tip holder 22 holding the pen tip 3; an ink reservoir 28 having the pen tip holder 22 at a front end thereof; and an ink tank 25 that has the ink reservoir 28 at a front end thereof and that directly stores the thermochromic ink 4. The ink reservoir 28 is a member that is interposed between the pen tip 3 and the ink tank 25 and that temporarily retains overflowing ink resultant from an increase in the internal pressure of the ink tank 25. A comb-shaped member is adopted for the ink reservoir. The friction body 7 is formed from a soft synthetic resin and attached to the rear-end hole of the ink tank 25.

In the present embodiment, the thermal conductivity of a friction portion of the friction body 7 is ranging from 0.05 W/(m·K) to 1.0 W/(m·K) and a friction coefficient of the friction portion of the friction body 7 to the paper surface is ranging from 0.2 to 1.0.

Sixth Embodiment

Figure 6:
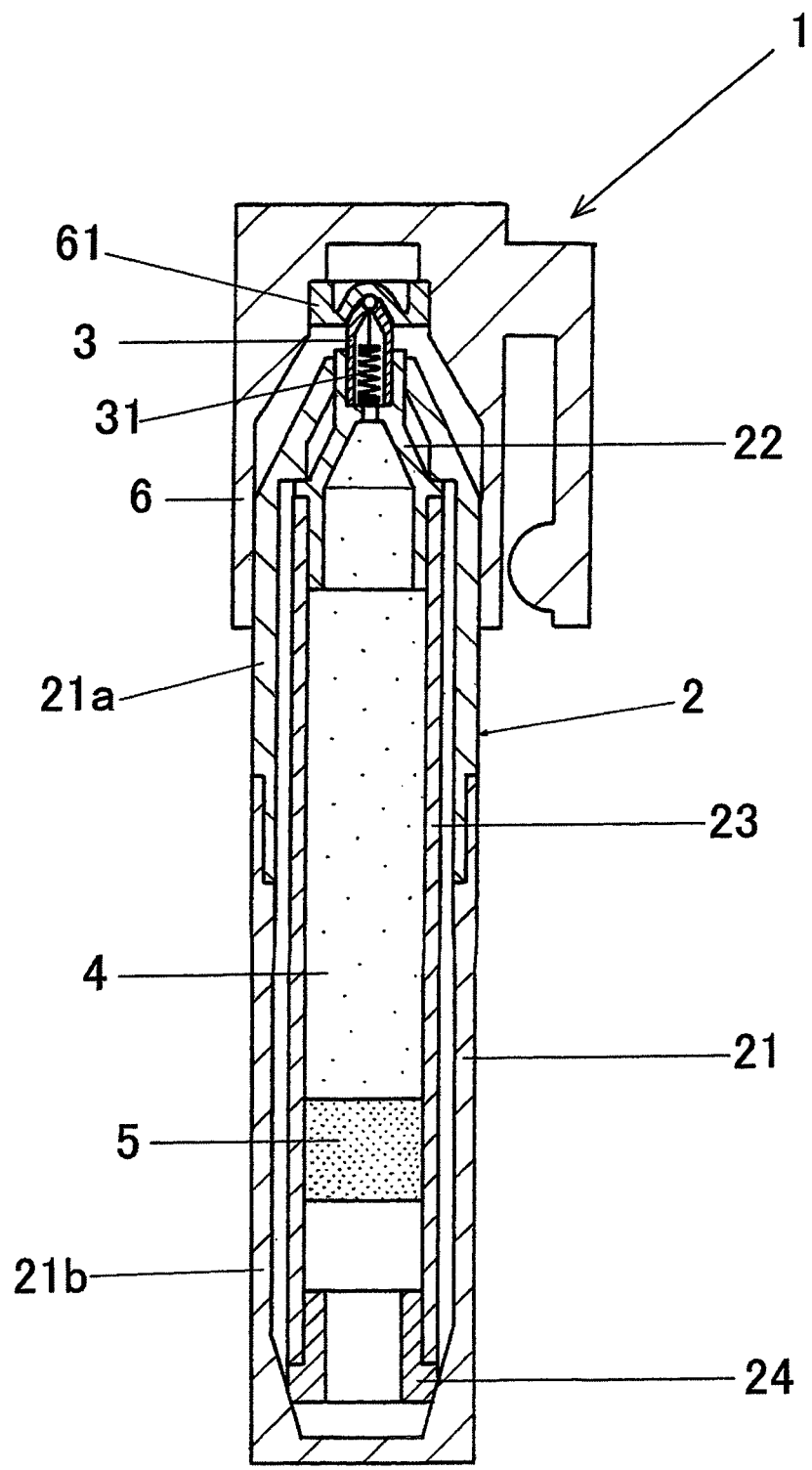
FIG. 6 is a longitudinal cross-sectional view of a writing instrument of a sixth embodiment of the present invention.
Figure 7:
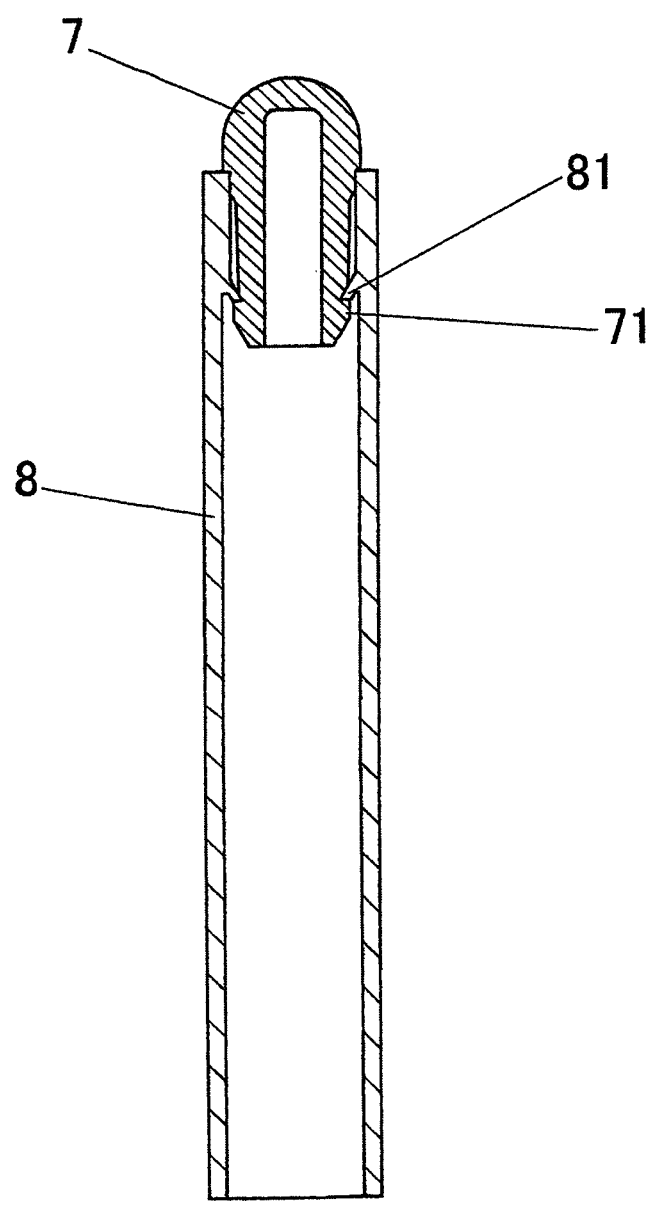
FIG. 7 is a longitudinal cross-sectional view of a friction body of the sixth embodiment of the present invention.
Figure 8:
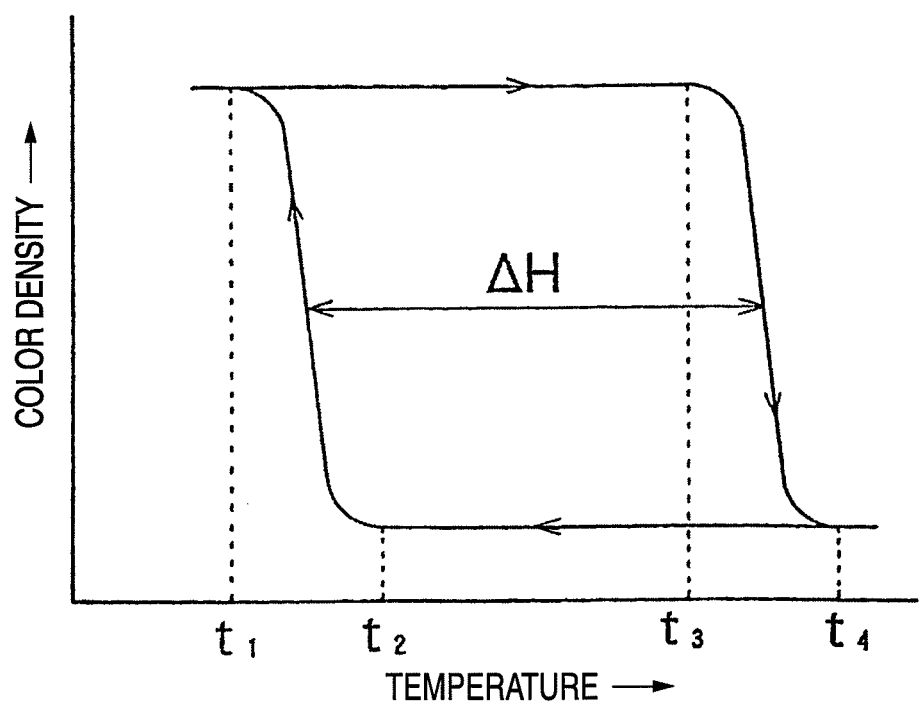
FIG. 8 is a descriptive view showing discoloration behavior of thermally color fadable reversible thermochromic ink.

A sixth embodiment of the present invention will now be described (see FIGS. 6 and 7).

The present embodiment is directed toward a writing instrument set having the writing instrument 1 and the friction body 7. The thermochromic ink 4 is stored in the writing instrument 1 and supplied from the pen tip 3. A thermochromic image or handwriting is formed on the paper surface as a result of the pen tip 3 of the writing instrument 1 contacting the paper surface. The thermochromic image or handwriting can be thermally discolored by rubbing the image or handwriting formed on the paper surface with the friction body 7.

The writing instrument 1 is made up of the writing instrument main body 2 which has the pen tip 3 at the front end thereof and stores the thermochromic ink 4 and the cap 6 removably attached to the pen tip side of the writing instrument main body 2.

The writing instrument main body 2 includes: a pen tip 3 made up of a ball-point-pen tip, a pen tip holder 22 to which the pen tip 3 is fixed at the front end thereof, an ink storage cylinder 23 to which the pen tip holder 22 is fixed at the front end thereof, the tail plug 24 that is attached to an opening formed in a rear end of the ink storage cylinder 23 and has a ventilation opening; and a barrel 21 accommodating the ink storage cylinder 23. The thermochromic ink 4 and the following element 5, which is disposed at the rear end of the thermochromic ink 4 and forwardly advances in association with consumption of the thermochromic ink 4, are housed in the ink storage cylinder 23. The barrel 21 is made up of the front barrel 21a and the rear barrel 21b that are screw-engaged with each other. The pen tip 3 protrudes outside from the front-end hole of the barrel 21 (the front barrel 21a).

A ball is held at the front end of the pen tip 3 in a rotatable manner. The elastic element (a coil spring) 31 is housed in the pen tip 3. The ball is urged forwardly by the elastic element 31, whereby the ball is brought into compressed contact with an inwardly-facing interior surface of the front end of the pen tip 3.

The pen tip seal member 61 made from a soft material is housed in the cap 6. When the cap 6 is attached to the pen tip side of the writing instrument, the pen tip 3 comes into close contact with the pen tip seal member 61, whereupon the pen tip 3 is sealed.

The outward protrusion 71 is provided on the exterior surface of the friction body 7 formed from a soft synthetic resin. The friction body 7 is attached to the front end of the friction body holder 8. The friction body holder 8 is cylindrical and the inward protrusion 81 is formed on the interior surface of the front end of the friction body holder. The inward outward protrusions 81, 71 are engaged with each other in a climbing manner, thereby preventing removal of the friction body 7.

In the present embodiment, the thermal conductivity of a friction portion of the friction body 7 is ranging from 0.05 W/(m·K) to 1.0 W/(m·K) and a friction coefficient of the friction portion of the friction body 7 to the paper surface is ranging from 0.2 to 1.0.

EXAMPLES

Table 1 shows results of tests for thermochromism property when thermochromic handwriting formed in thermochromic ink was rubbed under the certain values of (μ×W×V)/A, which is given by arbitrary selecting values of a friction coefficient μ between the friction body and the paper surface; vertical load W (N) imparted to the paper surface by the friction body during frictional motion; velocity V(m/s) at which the friction body travels over the paper surface during frictional motion; and a contact area A (cm²) at which the friction body contacts the paper surface during frictional motion.

In the tests, a total of four types of friction bodies consisting of (two types of) styrene-based resin, silicone resin and polypropylene resin were used. In the tests, thermochromic handwriting formed in thermochromic ink having a discoloration temperature (a high-temperature point of discoloration) of 45° C. was rubbed at an ambient temperature of 25° C. with a plurality of types of friction bodies.

Evaluations of thermochromism in the table are as follows:

I: Handwriting was totally discolored
II: Handwriting was essentially discolored
III: Handwriting was slightly discolored
IV: Handwriting remained completely undiscolored

TABLE 1

| test No. | μ | W | V | A | (μ × w × v)/A | thermochromism |
|---|---|---|---|---|---|---|
| 1 | 0.283 | 0.98 | 0.1 | 0.025 | 1.1 | IV |
| 2 | 0.780 | 1.96 | 0.1 | 0.071 | 2.2 | IV |
| 3 | 0.780 | 2.94 | 0.1 | 0.071 | 3.2 | IV |
| 4 | 0.476 | 1.96 | 0.1 | 0.022 | 4.2 | II |
| 5 | 0.780 | 4.90 | 0.1 | 0.071 | 5.4 | II |
| 6 | 0.476 | 2.96 | 0.1 | 0.024 | 5.9 | I |
| 7 | 0.497 | 3.92 | 0.1 | 0.027 | 7.2 | II |
| 8 | 0.497 | 4.90 | 0.1 | 0.031 | 7.9 | I |
| 9 | 0.283 | 3.92 | 0.2 | 0.025 | 8.9 | II |
| 10 | 0.283 | 2.94 | 0.3 | 0.025 | 10.0 | II |
| 11 | 0.283 | 4.90 | 0.2 | 0.025 | 11.1 | I |
| 12 | 0.476 | 0.98 | 0.5 | 0.019 | 12.3 | I |
| 13 | 0.780 | 2.94 | 0.4 | 0.071 | 12.9 | I |
| 14 | 0.497 | 3.92 | 0.2 | 0.027 | 14.4 | I |
| 15 | 0.476 | 4.90 | 0.2 | 0.031 | 15.0 | I |
| 16 | 0.497 | 4.90 | 0.2 | 0.031 | 15.7 | I |
| 17 | 0.476 | 2.94 | 0.3 | 0.025 | 16.8 | I |
| 18 | 0.497 | 2.94 | 0.3 | 0.025 | 17.5 | I |
| 19 | 0.780 | 5.88 | 0.3 | 0.071 | 19.4 | I |
| 20 | 0.283 | 5.88 | 0.3 | 0.025 | 20.0 | I |
| 21 | 0.497 | 3.92 | 0.3 | 0.027 | 21.6 | I |
| 22 | 0.283 | 3.92 | 0.5 | 0.025 | 22.2 | I |
| 23 | 0.476 | 4.90 | 0.3 | 0.031 | 22.6 | I |
| 24 | 0.497 | 4.90 | 0.3 | 0.031 | 23.6 | I |
| 25 | 0.476 | 5.88 | 0.3 | 0.034 | 24.7 | I |
| 26 | 0.497 | 5.88 | 0.3 | 0.034 | 25.8 | I |
| 27 | 0.780 | 4.90 | 0.5 | 0.071 | 26.9 | I |
| 28 | 0.497 | 3.92 | 0.4 | 0.027 | 28.9 | I |

TABLE 1-continued

| test No. | μ | W | V | A | (μ × w × v)/A | thermochromism |
|---|---|---|---|---|---|---|
| 29 | 0.476 | 2.94 | 0.5 | 0.024 | 29.2 | I |
| 30 | 0.497 | 2.94 | 0.5 | 0.025 | 29.2 | I |

Table 2 shows results of tests for thermochromism property when thermochromic handwriting formed in thermochromic ink was rubbed under the certain values of μ/A, which is given by arbitrary selecting values of a friction coefficient μ between the friction body and the paper surface; and a contact area A (cm²) at which the friction body contacts the paper surface during frictional motion, and also setting the vertical load W (N) imparted to the paper surface by the friction body during frictional motion as 4.9 N; and the velocity V(m/s) at which the friction body travels over the paper surface during frictional motion as 0.5 m/s.

In the tests, a total of four types of friction bodies consisting of (two types of) styrene-based resin, silicone resin and polypropylene resin were used. In the tests, thermochromic handwriting formed in thermochromic ink having a discoloration temperature (a high-temperature point of discoloration) of 45° C. was rubbed at an ambient temperature of 25° C. with a plurality of types of friction bodies.

Evaluations of thermochromism in the table are as follows:

I: Handwriting was totally discolored
II: Handwriting was essentially discolored
III: Handwriting was slightly discolored
IV: Handwriting remained completely undiscolored

TABLE 2

| test No. | μ | A | μ/A | thermochromism |
|---|---|---|---|---|
| 1 | 0.283 | 0.283 | 1.0 | IV |
| 2 | 0.476 | 0.317 | 1.5 | II |
| 3 | 0.476 | 0.238 | 2.0 | II |
| 4 | 0.476 | 0.190 | 2.5 | I |
| 5 | 0.780 | 0.260 | 3.0 | I |
| 6 | 0.476 | 0.136 | 3.5 | I |
| 7 | 0.283 | 0.071 | 4.0 | II |
| 8 | 0.476 | 0.106 | 4.5 | I |
| 9 | 0.283 | 0.057 | 5.0 | I |
| 10 | 0.283 | 0.051 | 5.5 | I |
| 11 | 0.283 | 0.047 | 6.0 | I |
| 12 | 0.476 | 0.073 | 6.5 | I |
| 13 | 0.780 | 0.111 | 7.0 | I |
| 14 | 0.497 | 0.066 | 7.5 | I |
| 15 | 0.476 | 0.060 | 7.9 | I |
| 16 | 0.497 | 0.058 | 8.6 | I |
| 17 | 0.476 | 0.053 | 9.0 | I |
| 18 | 0.497 | 0.052 | 9.6 | I |
| 19 | 0.780 | 0.078 | 10.0 | I |
| 20 | 0.283 | 0.027 | 10.5 | I |
| 21 | 0.497 | 0.045 | 11.0 | I |
| 22 | 0.283 | 0.025 | 11.3 | I |
| 23 | 0.476 | 0.040 | 11.9 | I |
| 24 | 0.497 | 0.040 | 12.4 | I |
| 25 | 0.476 | 0.037 | 12.9 | I |
| 26 | 0.497 | 0.037 | 13.4 | I |
| 27 | 0.780 | 0.056 | 13.9 | I |
| 28 | 0.497 | 0.034 | 14.6 | I |
| 29 | 0.476 | 0.032 | 14.9 | I |
| 30 | 0.497 | 0.032 | 15.5 | I |

Table 3 shows results of tests for thermochromism property when thermochromic handwriting formed in thermochromic ink was rubbed under the certain values of (μ×W×V)/A, which is given by arbitrary selecting values of a friction coefficient μ between the friction body and the paper surface; vertical load W (N) imparted to the paper surface by the friction body during frictional motion; velocity V(m/s) at which the friction body travels over the paper surface during frictional motion; and a contact area A (cm$^2$) at which the friction body contacts the paper surface during frictional motion.

In the tests, a total of five types of friction bodies consisting of (two types of) styrene-based resin, silicone resin, polypropylene resin and iron were used. In the tests, thermochromic handwriting formed in thermochromic ink having a discoloration temperature (a high-temperature point of discoloration) of 60° C. was rubbed at an ambient temperature of 25° C. with a plurality of types of friction bodies.

Evaluations of thermochromism in the table are as follows:
  I: Handwriting was totally discolored
  II: Handwriting was essentially discolored
  III: Handwriting was slightly discolored
  IV: Handwriting remained completely undiscolored

TABLE 3

| test No. | μ | W | V | A | (μ × w × v)/A | thermochromism |
|---|---|---|---|---|---|---|
| 1 | 0.121 | 2.94 | 0.1 | 0.031 | 1.1 | IV |
| 2 | 0.780 | 1.96 | 0.1 | 0.074 | 2.1 | IV |
| 3 | 0.283 | 2.94 | 0.1 | 0.025 | 3.3 | IV |
| 4 | 0.780 | 3.92 | 0.1 | 0.074 | 4.1 | IV |
| 5 | 0.780 | 0.98 | 0.5 | 0.075 | 5.1 | IV |
| 6 | 0.497 | 2.94 | 0.1 | 0.025 | 5.8 | IV |
| 7 | 0.497 | 3.92 | 0.1 | 0.027 | 7.2 | IV |
| 8 | 0.497 | 4.90 | 0.1 | 0.031 | 7.9 | IV |
| 9 | 0.283 | 1.96 | 0.4 | 0.025 | 8.9 | IV |
| 10 | 0.283 | 2.94 | 0.3 | 0.025 | 10.0 | IV |
| 11 | 0.283 | 1.96 | 0.5 | 0.025 | 11.1 | IV |
| 12 | 0.476 | 0.98 | 0.5 | 0.019 | 12.3 | III |
| 13 | 0.780 | 2.94 | 0.4 | 0.071 | 12.9 | III |
| 14 | 0.497 | 3.92 | 0.2 | 0.027 | 14.4 | III |
| 15 | 0.476 | 4.90 | 0.2 | 0.031 | 15.0 | II |
| 16 | 0.497 | 4.90 | 0.2 | 0.031 | 15.7 | II |
| 17 | 0.476 | 2.94 | 0.3 | 0.025 | 16.8 | II |
| 18 | 0.497 | 2.94 | 0.3 | 0.025 | 17.5 | II |
| 19 | 0.780 | 5.85 | 0.3 | 0.072 | 19.0 | I |
| 20 | 0.283 | 5.88 | 0.3 | 0.025 | 20.0 | II |
| 21 | 0.497 | 3.92 | 0.3 | 0.028 | 20.9 | II |
| 22 | 0.283 | 4.90 | 0.4 | 0.025 | 22.2 | II |
| 23 | 0.476 | 4.92 | 0.3 | 0.031 | 22.7 | I |
| 24 | 0.497 | 4.90 | 0.3 | 0.031 | 23.6 | I |
| 25 | 0.476 | 5.88 | 0.3 | 0.034 | 24.7 | I |
| 26 | 0.497 | 5.88 | 0.3 | 0.034 | 25.8 | I |
| 27 | 0.780 | 4.90 | 0.5 | 0.071 | 26.9 | I |
| 28 | 0.497 | 3.92 | 0.4 | 0.028 | 27.8 | I |
| 29 | 0.476 | 2.94 | 0.5 | 0.024 | 29.2 | I |
| 30 | 0.497 | 2.94 | 0.5 | 0.024 | 30.4 | I |

Table 4 shows results of tests for thermochromism property when thermochromic handwriting formed in thermochromic ink was rubbed under the certain values of μ/A, which is given by arbitrary selecting values of a friction coefficient μ between the friction body and the paper surface; and a contact area A (cm$^2$) at which the friction body contacts the paper surface during frictional motion, and also setting the vertical load W (N) imparted to the paper surface by the friction body during frictional motion as 4.9 N; and the velocity V(m/s) at which the friction body travels over the paper surface during frictional motion as 0.5 m/s.

In the tests, a total of four types of friction bodies consisting of (two types of) styrene-based resin, silicone resin and polypropylene resin were used. In the tests, thermochromic handwriting formed in thermochromic ink having a discoloration temperature of (a high-temperature point of discoloration) 60° C. was rubbed at an ambient temperature of 25° C. with a plurality of types of friction bodies.

Evaluations of thermochromism in the table are as follows:
  I: Handwriting was totally discolored
  II: Handwriting was essentially discolored
  III: Handwriting was slightly discolored
  IV: Handwriting remained completely undiscolored

TABLE 4

| test No. | μ | A | μ/A | thermochromism |
|---|---|---|---|---|
| 1 | 0.283 | 0.283 | 1.0 | IV |
| 2 | 0.476 | 0.317 | 1.5 | IV |
| 3 | 0.476 | 0.238 | 2.0 | IV |
| 4 | 0.476 | 0.190 | 2.5 | IV |
| 5 | 0.780 | 0.260 | 3.0 | IV |
| 6 | 0.476 | 0.136 | 3.5 | IV |
| 7 | 0.283 | 0.071 | 4.0 | IV |
| 8 | 0.476 | 0.106 | 4.5 | IV |
| 9 | 0.283 | 0.057 | 5.0 | IV |
| 10 | 0.497 | 0.090 | 5.5 | III |
| 11 | 0.476 | 0.079 | 6.0 | II |
| 12 | 0.476 | 0.073 | 6.5 | I |
| 13 | 0.780 | 0.111 | 7.0 | I |
| 14 | 0.497 | 0.066 | 7.5 | II |
| 15 | 0.476 | 0.060 | 7.9 | I |
| 16 | 0.497 | 0.058 | 8.6 | I |
| 17 | 0.476 | 0.053 | 9.0 | I |
| 18 | 0.497 | 0.052 | 9.6 | I |
| 19 | 0.780 | 0.078 | 10.0 | I |
| 20 | 0.283 | 0.027 | 10.5 | I |
| 21 | 0.497 | 0.045 | 11.0 | I |
| 22 | 0.283 | 0.025 | 11.3 | I |
| 23 | 0.476 | 0.040 | 11.9 | I |
| 24 | 0.497 | 0.040 | 12.4 | I |
| 25 | 0.476 | 0.037 | 12.9 | I |
| 26 | 0.497 | 0.037 | 13.4 | I |
| 27 | 0.780 | 0.056 | 13.9 | I |
| 28 | 0.497 | 0.034 | 14.6 | I |
| 29 | 0.476 | 0.032 | 14.9 | I |
| 30 | 0.497 | 0.032 | 15.5 | I |

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A friction body which is adapted to rub a thermochromic image or handwriting formed on a paper surface by use of thermochromic ink to thermally discolor the thermochromic image or handwriting by frictional heat resultant from rubbing,
   wherein thermal conductivity of a friction portion of the friction body is ranging from 0.05 W/(m·K) to 50 W/(m·K).

2. The friction body according to claim 1, wherein
   the thermal conductivity of the friction portion of the friction body is ranging from 0.05 W/(m·K) to 20 W/(m·K).

3. The friction body according to claim 2, wherein
   the thermal conductivity of the friction portion of the friction body is ranging from 0.05 W/(m·K) to 10 W/(m·K).

4. The friction body according to claim 1, wherein
   a friction coefficient between the friction portion of the friction body and the paper surface is ranging from 0.2 to 1.0.

5. The friction body according to claim 1, wherein
when a friction coefficient between the friction body and the paper surface is defined as $\mu$;
a vertical load imparted to the paper surface by the friction body when the thermochromic image or handwriting on the paper surface is rubbed with the friction body is defined as W (N);
a velocity at which the friction body travels over the paper surface when the thermochromic image or handwriting on the paper surface is rubbed with the friction body is defined as V (m/s); and
a contact area where the friction body contacts the paper surface when the thermochromic image or handwriting on the paper surface is rubbed with the friction body is defined as A (cm$^2$),
the friction body satisfies a relation of $(\mu \times W \times V)/A \geq 4$.

6. The friction body according to claim 5, wherein the friction body satisfies a relation of $(\mu \times W \times V)/A \geq 15$.

7. The friction body according to claim 5, wherein the friction body satisfies a relation of $(\mu \times W \times V)/A \leq 2000$.

8. The friction body according to claim 5, wherein the load W is selected from a range from 0.9 N to 10 N, and
the contact area A is selected from a range from 0.005 cm$^2$ to 0.3 cm$^2$.

9. The friction body according to claim 5, wherein, when frictional motion is manually performed, the velocity V is selected from a range from 0.1 m/s to 1.0 m/s.

10. The friction body according to claim 1 wherein, when a vertical load W imparted to the paper surface by the friction body when the thermochromic image or handwriting on the paper surface is rubbed with the friction body is set to be 4.9 N; and
a velocity V at which the friction body travels over the paper surface when the thermochromic image or handwriting on the paper surface is rubbed with the friction body is set to be 0.5 m/s, and
a friction coefficient between the friction body and the paper surface is defined as $\mu$; and
a contact area where the friction body contacts the paper surface when the thermochromic image or handwriting on the paper surface is rubbed with the friction body is defined as A (cm$^2$),
the friction body satisfies a relation of $\mu/A \geq 1.5$.

11. The friction body according to claim 10, wherein the friction body satisfies a relation of $\mu/A \geq 6$.

12. The friction body according to claim 10, wherein the friction body satisfies a relation of $\mu/A \leq 200$.

13. The friction body according to claim 10, wherein the contact area A is selected from a range from 0.005 cm$^2$ to 0.3 cm$^2$.

14. A writing instrument comprising:
the friction body defined in claim 1; and
a thermochromic ink which is adapted to be flowed out.

15. The writing instrument according to claim 14, comprising:
a writing instrument main body;
the thermochromic ink incorporated in the writing instrument main body; and
a pen tip made up of a ball-point-pen tip and capable of supplying the thermochromic ink, the pen tip being provided at a front end of the writing instrument main body,
wherein the friction body is provided at a rear end of the writing instrument main body.

16. The writing instrument according to claim 14, comprising:
a writing instrument main body;
the thermochromic ink incorporated in the writing instrument main body;
a pen tip made up of a ball-point-pen tip and capable of supplying the thermochromic ink, the pen tip being provided at a front end of the writing instrument main body; and
a removable cap provided at a pen tip side of the writing instrument main body,
wherein the friction body is provided at a top of the cap.

17. The writing instrument according to claim 14, comprising:
a pen tip made of a processed fibrous element or a porous element which is capable of supplying the thermochromic ink;
a writing instrument main body comprising:
an ink tank which stores thermochromic ink and to which the pen tip is attached so as to be movable back and forward; and
a valve mechanism which opens when the pen tip is pressed rearward; and
a removable cap provided at the pen tip side of the writing instrument main body,
wherein the friction body is provided at a rear end of the writing instrument main body or a top of the cap.

18. The writing instrument according to claim 14, comprising:
a writing instrument main body comprising:
an ink absorbing element which is made of an element having continuous pores and impregnated with the thermochromic ink and
a pen tip which is made of a processed fibrous element or a porous element, which is connected to the ink absorbing element and which supplies the thermochromic ink; and
a removable cap provided at a pen tip side of the writing instrument main body,
wherein the friction body is provided at a rear end of the writing instrument main body or the top of the cap.

19. The writing instrument according claim 14, comprising:
a writing instrument main body comprising:
a pen tip made up of a ball-point-pen tip which supplies the thermochromic ink;
an ink tank storing the thermochromic ink; and
an ink reservoir which is interposed between the pen tip and the ink tank and which temporarily holds overflowing ink when an internal pressure of the ink tank increases; and
a removable cap provided at a pen tip side of the writing instrument main body,
wherein the friction body is provided at a rear end of the writing instrument main body or a top of the cap.

20. A writing instrument set comprising:
the friction body defined in claim 1; and
a writing instrument which incorporates and supplies the thermochromic ink.

21. A friction body which is adapted to rub a thermochromic image or handwriting formed on a paper surface by use of thermochromic ink to thermally discolor the thermochromic image or handwriting by frictional heat resultant from rubbing, wherein
when a friction coefficient between the friction body and the paper surface is defined as $\mu$;

a vertical load imparted to the paper surface by the friction body when the thermochromic image or handwriting on the paper surface is rubbed with the friction body is defined as W (N);

a velocity at which the friction body travels over the paper surface when the thermochromic image or handwriting on the paper surface is rubbed with the friction body is defined as V (m/s); and a contact area where the friction body contacts the paper surface when the thermochromic image or handwriting on the paper surface is rubbed with the friction body is defined as A (cm$^2$), the friction body satisfies a relation of $(\mu \times W \times V)/A \geq 4$.

22. The friction body according to claim 21, wherein the friction body satisfies a relation of $(\mu \times W \times V)/A \leq 2000$.

23. The friction body according to claim 21, wherein the friction coefficient 4 between the friction portion of the friction body and the paper surface is ranging from 0.2 to 1.0.

24. The friction body according to claim 21, wherein the load W is selected from a range from 0.9 N to 10 N and the contact area A is selected from a range from 0.005 cm$^2$ to 0.3 cm$^2$.

25. The friction body according to claim 21, wherein when frictional motion is manually performed, the velocity V is selected from a range from 0.1 m/s to 1.0 m/s.

26. A writing instrument comprising,
the friction body defined in claim 21; and
a thermochromic ink which is adapted to be flowed out.

27. The writing instrument according to claim 26, comprising:
a writing instrument main body;
the thermochromic ink incorporated in the writing instrument main body; and
a pen tip made up of a ball-point-pen tip and capable of supplying the thermochromic ink, the pen tip being provided at a front end of the writing instrument main body,
wherein the friction body is provided at a rear end of the writing instrument main body.

28. The writing instrument according to claim 26, comprising:
a writing instrument main body;
the thermochromic ink incorporated in the writing instrument main body;
a pen tip made up of a ball-point-pen tip and capable of supplying the thermochromic ink, the pen tip being provided at a front end of the writing instrument main body; and
a removable cap provided at a pen tip side of the writing instrument main body,
wherein the friction body is provided at a top of the cap.

29. The writing instrument according to claim 26, comprising:
a pen tip made of a processed fibrous element or a porous element which is capable of supplying the thermochromic ink;
a writing instrument main body comprising:
an ink tank which stores the thermochromic ink and to which the pen tip is attached so as to be movable back and forward; and
a valve mechanism which opens when the pen tip is pressed rearward; and
a removable cap provided at the pen tip side of the writing instrument main body,
wherein the friction body is provided at a rear end of the writing instrument main body or a top of the cap.

30. The writing instrument according to claim 26, comprising:
a writing instrument main body comprising:
an ink absorbing element which is made of an element having continuous pores and impregnated with the thermochromic ink and
a pen tip which is made of a processed fibrous element or a porous element, which is connected to the ink absorbing element and which supplies the thermochromic ink; and
a removable cap provided at a pen tip side of the writing instrument main body;
wherein the friction body is provided at a rear end of the writing instrument main body or the top of the cap.

31. The writing instrument according claim 26, comprising:
a writing instrument main body comprising:
a pen tip made up of a ball-point-pen tip which supplies the thermochromic ink;
an ink tank storing the thermochromic ink; and
an ink reservoir which is interposed between the pen tip and the ink tank and which temporarily holds overflowing ink when an internal pressure of the ink tank increases; and
a removable cap provided at a pen tip side of the writing instrument main body,
wherein the friction body is provided at a rear end of the writing instrument main body or a top of the cap.

32. A writing instrument set comprising:
the friction body defined in claim 21; and
a writing instrument which incorporates and supplies the thermochromic ink.

33. A friction body which is adapted to rub a thermochromic image or handwriting formed on a paper surface by use of thermochromic ink to thermally discolor the thermochromic image or handwriting by frictional heat resultant from rubbing, wherein when a vertical load W imparted to the paper surface by the friction body when the thermochromic image or handwriting on the paper surface is rubbed with the friction body is set to be 4.9 N; and a velocity V at which the friction body travels over the paper surface when the thermochromic image or handwriting on the paper surface is rubbed with the friction body is set to be 0.5 m/s, and a friction coefficient between the friction body and the paper surface is defined as $\mu$; and a contact area where the friction body contacts the paper surface when the thermochromic image or handwriting on the paper surface is rubbed with the friction body is defined as A (cm$^2$), the friction body satisfies a relation of $\mu/A \geq 1.5$.

34. The friction body according to claim 33, wherein the friction body satisfies a relation of $\mu/A \leq 200$.

35. The friction body according to claim 33, wherein the friction coefficient $\mu$ between the friction portion of the friction body and the paper surface is ranging from 0.2 to 1.0.

36. The friction body according to claim 33, wherein the contact area A is selected from a range from 0.005 cm$^2$ to 0.3 cm$^2$.

37. A friction body which is adapted to rub a thermochromic image or handwriting formed on a paper surface by use of thermochromic ink to thermally discolor the thermochromic image or handwriting by frictional heat resultant from rubbing, wherein when a friction coefficient between the friction body and the paper surface is defined as $\mu$;

a vertical load imparted to the paper surface by the friction body when the thermochromic image or handwriting on the paper surface is rubbed with the friction body is defined as W (N), a velocity at which the friction body travels over the paper surface when the thermochromic image or handwriting on the paper surface is rubbed with the friction body is defined as V (m/s); and a contact area where the friction body contacts the paper surface when the thermochromic image or handwriting on the paper surface is rubbed with the friction body is defined as A (cm$^2$), the friction body satisfies a relation of $(\mu \times W \times V)/A \geq 15$.

38. The friction body according to claim 37, wherein the friction body satisfies a relation of $(\mu \times W \times V)/A \leq 2000$.

39. The friction body according to claim 37, wherein the friction coefficient $\mu$ between the friction portion of the friction body and the paper surface is ranging from 0.2 to 1.0.

40. The friction body according to claim 37, wherein the load W is selected from a range from 0.9 N to 10 N and the contact area A is selected from a range from 0.005 cm$^2$ to 0.3 cm$^2$.

41. The friction body according to claim 37, wherein, when frictional motion is manually performed, the velocity V is selected from a range from 0.1 m/s to 1.0 m/s.

42. A friction body which is adapted to rub a thermochromic image or handwriting formed on a paper surface by use of thermochromic ink to thermally discolor the thermochromic image or handwriting by frictional heat resultant from rubbing, wherein when a vertical load W imparted to the paper surface by the friction body when the thermochromic image or handwriting on the paper surface is rubbed with the friction body is set to be 4.9 N; and a velocity V at which the friction body travels over the paper surface when the thermochromic image or handwriting on the paper surface is rubbed with the friction body is set to be 0.5 m/s, and a friction coefficient between the friction body and the paper surface is defined as $\mu$; and a contact area where the friction body contacts the paper surface when the thermochromic image or handwriting on the paper surface is rubbed with the friction body is defined as A (cm$^2$), the friction body satisfies a relation of $\mu/A \geq 6$.

43. The friction body according to claim 42, wherein the friction body satisfies a relation of $\mu/A \leq 200$.

44. The friction body according to claim 42, wherein the friction coefficient $\mu$ between the friction portion of the friction body and the paper surface is ranging from 0.2 to 1.0.

45. The friction body according to claim 42, wherein the contact area A is selected from a range from 0.005 cm$^2$ to 0.3 cm$^2$.

* * * * *